US011326697B2

(12) United States Patent
Reuter

(10) Patent No.: US 11,326,697 B2
(45) Date of Patent: May 10, 2022

(54) JET VALVE

(71) Applicant: Marco Systemanalyse und Entwicklung GmbH, Dachau (DE)

(72) Inventor: Martin Reuter, Dachau (DE)

(73) Assignee: Marco Systemanalyse und Entwicklung GmbH, Dachau (DE)

(*) Notice: Subject to any disclaimer, the term of this patent is extended or adjusted under 35 U.S.C. 154(b) by 0 days.

(21) Appl. No.: 16/438,432

(22) Filed: Jun. 11, 2019

(65) Prior Publication Data

US 2019/0376602 A1 Dec. 12, 2019

(51) Int. Cl.
*F16K 1/14* (2006.01)
*F16K 1/42* (2006.01)
*B05B 1/30* (2006.01)

(52) U.S. Cl.
CPC .......... *F16K 1/14* (2013.01); *F16K 1/42* (2013.01); *B05B 1/302* (2013.01)

(58) Field of Classification Search
CPC ..... F16K 1/14; F16K 1/06; F16K 1/36; F16K 1/38; F16K 1/42; F16K 1/54; F16K 15/04; F16K 15/044; F16K 15/048; F16K 15/183; F16K 25/02; F16K 27/0245; F16K 27/0254; B05B 1/302
See application file for complete search history.

(56) References Cited

U.S. PATENT DOCUMENTS 5,435,488 A * 7/1995 Abiko ............... B05B 1/302
239/110
9,797,519 B2 * 10/2017 Gyger ............... F16K 25/005
2007/0228193 A1 * 10/2007 Kato ............... F02M 61/1866
239/533.2
2011/0042605 A1 2/2011 Gyger et al.
2012/0312838 A1 12/2012 Clark et al.
2016/0263594 A1 9/2016 MacIndoe
2018/0043388 A1 2/2018 Ahmadi et al.

FOREIGN PATENT DOCUMENTS

| DE | 202004002167 | | 6/2004 | |
| DE | 102007014990 A1 | * | 10/2007 | ............ F02M 61/18 |
| DE | 102014217367 | | 9/2014 | |
| DE | 102014217367 A1 | | 9/2014 | |
| DE | 102014217367 A1 | * | 3/2016 | ............... F16K 1/42 |
| DE | 102016203693 | | 9/2016 | |
| DE | 102016207803 | | 11/2016 | |
| JP | 55-046576 | | 4/1980 | |
| JP | 59-82077 | | 5/1984 | |
| JP | 60-194167 | | 10/1985 | |
| JP | 05-5470 A | | 1/1993 | |

(Continued)

OTHER PUBLICATIONS

German search report 102018114030.4, dated Jul. 3, 2019.

(Continued)

*Primary Examiner* — Hailey K. Do
(74) *Attorney, Agent, or Firm* — Ryder, Mazzeo & Konieczny LLC; Joseph M. Konieczny, Sr.

(57) ABSTRACT

A jet valve has a medium passage that leads to a discharge opening and that is closable by a sealing element that can be set against a seal seat. The seal seat has a sealing surface in the form of an annular strip. The jet valve has a high service life and is suitable for metering very small quantities.

5 Claims, 2 Drawing Sheets

(56) References Cited

FOREIGN PATENT DOCUMENTS

| JP | 531130424 | 4/2003 |
|---|---|---|
| KR | 08-254170 | 10/1996 |
| KR | 10-2000-0071199 | 11/2000 |
| KR | 2000-501331 | 2/2020 |
| WO | 2015020940 | 2/2015 |

OTHER PUBLICATIONS

Translation of Office Action for counterpart Chinese patent application No. 201910456463.1 dated Oct. 10, 2020.
Translation of Office Action for counterpart Korean patent application No. 10-2019-0067881 dated Aug. 4, 2020.
Translation of Office Action for counterpart Japanese patent application No. 2019-108389 dated Aug. 4, 2020.
Translation of Office Action for counterpart Korean patent application No. 10-2000-0071199 dated Feb. 23, 2021.
Translation of German (DE) application No. 10201217 and Japanese application No. 53130424.
Translation of German application No. 15/059,109 comprising the U.S. Appl. No. 15/059,109.
Translation of German application No. 102016207803 comprising the U.S. Pat. No. 10,213,795.
Translation of Office Action of counterpart Chinese patent application No. 201910456463.1.
English language Abstract of DE 102014217367A1.

\* cited by examiner

JET VALVE

FIELD OF THE INVENTION

The present invention relates to a jet valve for a contactless application of metered quantities of a medium.

BACKGROUND OF THE INVENTION

Adhesive bonding processes are required for a large number of production steps in the production of electronic components and devices such as smartphones and tablets. Jet valves are frequently used for this purpose since they, on the one hand, permit a contactless application of the adhesive—or also of other media—and, on the other hand, also enable very high metering frequencies. Ever smaller drops and narrower adhesive lines are required here due to the increasing miniaturization of the components for electronic devices. The metering quantity dispensed per individual shot also depends on the shape of the seal seat of the metering valve.

The shape of a seal seat is typically composed of ball spheres, cones, cylinders, and planar surfaces and is contingent on manufacturing. The same applies to the sealing element, typically a valve needle, moved by the valve drive. It frequently has a sphere or a machined ball sphere or a conical contour as the sealing element or as the sealing contour. This restriction of the geometrical shapes, however, has the result that the metering quantity can hardly be further reduced.

A pointed cone at the metering needle that seals at an edge of the valve seat is also conceivable as a further geometrical shape. This shape will only have a very limited service life in practice.

The valve needle has to be centered on the sealing surface so that the valve seals properly in the closed state. This work can be taken over by the sealing surface. The centering effect of the sealing surface, however, means that the angle at which the metering needle contacts the valve seat is not too small. However, this angle also determines the volume that is jetted downwardly out of the valve through a discharge opening by the movement of the metering needle.

An escape velocity has to be reached during jetting that is sufficient to overcome the surface tension of the medium. The surface tension is in turn dependent on the design of the outer surface and of the outer contour of the nozzle. The metering quantity is determined by the volume that is accelerated on the closing of the valve. This volume results from the ratio between the flow resistance of the discharge passage of the nozzle and the flow resistance at the sealing surface and the stroke that the sealing element still covers on closing once the flow resistance of the nozzle passage is smaller than the flow resistance of the sealing surface. As soon as the flow resistance at the sealing surface is greater than the flow resistance of the discharge nozzle, the medium is no longer urged back along the sealing surface on the closing of the valve, but is rather pushed and accelerated through the nozzle passage.

It is the object of the present invention to provide a jet valve by which the jetting of high viscosity media is possible in very small quantities with a high service life. This object is satisfied by the features of claim 1.

SUMMARY OF THE INVENTION

The jet valve in accordance with the invention has a medium passage that leads to a discharge opening and that is closable by a spherical sealing element that can be set against a seal seat. In accordance with the invention, the seal seat has a sealing surface in the form of a spherically curved annular strip, with the seal seat having a surface contour subsequent to the sealing surface spaced apart from the sealing element, said surface contour forming a gap with the sealing element when the latter contacts the sealing surface.

It has been recognized in accordance with the invention that it is advantageous to reduce the accelerated volume beneath the seal seat for the reduction of the metering volume. At the same time, however, the effectively active sealing surface must remain small. With too great a sealing surface, the downward movement of the metering needle is damped/braked too greatly and the jetting of media, above all high viscosity media, is no longer possible. Since the surface contour and the sealing element are spherical at least in the region of the gap, a very small volume is provided in the form of a spherical shell between the surface contour and the sealing element.

Advantageous embodiments of the invention are described in the description of the drawing and in the dependent claims.

In accordance with an embodiment, the width of the gap between the surface contour of the sealing surface and the sealing element can be no larger than the width of the annular strip, whereby a noticeable hydrodynamic damping of the closing movement of the sealing element is prevented.

In accordance with a further advantageous embodiment, a step can be provided between the surface contour and the sealing surface. It can hereby be ensured that a sufficiently narrow annular strip is present as the sealing surface, on the one hand. On the other hand, a small, but sufficient spacing between the surface contour and the sealing element can be provided.

In accordance with a further advantageous embodiment, the surface contour can extend in parallel with the sealing element in the region of the gap. The medium is hereby compressed to a thin liquid film on the closing of the valve in the region of the gap without a noticeable damping occurring.

In accordance with a further advantageous embodiment, the width of the annular strip can amount to approximately 25 to 55 µm, in particular to approximately 30 to 50 µm. A sufficient sealing surface is hereby provided, on the one hand, but a sufficiently small sealing surface, on the other hand.

In accordance with a further advantageous embodiment, the width of the gap can amount to approximately 1 to 30 µm, in particular to approximately 5 to 25 µm. It has namely been found that with such a dimensioning, on the one hand, a sufficiently large volume is provided between the sealing element and the surface contour to minimize a hydrodynamic damping. On the other hand, the volume is selected as so small that a jetting of very small volumes is possible.

In accordance with a further advantageous embodiment, an aperture can be provided at the center of the gap that leads to the discharge opening, that initially tapers conically, starting from the gap, and that is subsequently formed as a hollow cylindrical discharge passage up to the discharge opening. In this respect, the hollow cylindrical discharge passage of the aperture can have a diameter of 40 to 50 µm and/or a length of approximately 100 to 300 µm. Very small quantities of medium can be metered with high cycle times with such a dimensioning.

In accordance with a further advantageous embodiment, the discharge opening can be configured as an orifice of a hollow cylindrical discharge passage, with the angle between the wall of the discharge passage and the surface surrounding the discharge opening being an acute angle, viewed in cross-section, that in particular amounts to less than 60°, in particular 45° or less. The accumulation of medium to be metered at the outer surface of the discharge opening is hereby considerably reduced. The medium sees a curved surface at an edge. The surface tension effects a minimization of the surface and has the result with edges that the liquid to be wetted is displaced in the direction of the planar surfaces. The layer thickness of the liquid is thus reduced in the region of the edge and the liquid film can break off (dewetting). The more acute the edge angle, the greater this effect is.

In accordance with a further advantageous embodiment, the discharge opening cannot be formed in a core of the valve. This means that the discharge opening and the discharge passage leading thereto is worked in solid material, for example in a housing part of the jet valve. The advantage hereby results with respect to the discharge nozzles known from the prior art that are formed as cores that no separate assembly is needed and no centering of the core has to take place. At the same time, the discharge opening and the discharge passage can be formed considerably smaller.

In accordance with a further embodiment, the width of the gap between the sealing surface and a discharge passage leading to the discharge opening can be reduced stepwise, in particular to approximately 10-15 µm. The reduction of the gap width can take place by an annular web here that is arranged around the discharge passage.

The sealing surface can furthermore be at a sufficiently large angle in this embodiment. The gap between the sealing element and the seal seat can, however, be formed as larger directly subsequent to the sealing surface. This gap is, however, reduced stepwise in the region around the discharge passage to typically 10 µm. This thinner gap increases the effectively acting flow resistance of the nozzle. The stroke that the sealing element still makes on closing once the flow resistance of the nozzle passage is smaller than the flow resistance of the sealing surface is thus smaller and the metering quantity can thus also be reduced.

The present invention will be described in the following purely by way of example with reference to an advantageous embodiment and to a drawing.

DETAILED DESCRIPTION OF PREFERRED EMBODIMENTS

Figure 1:
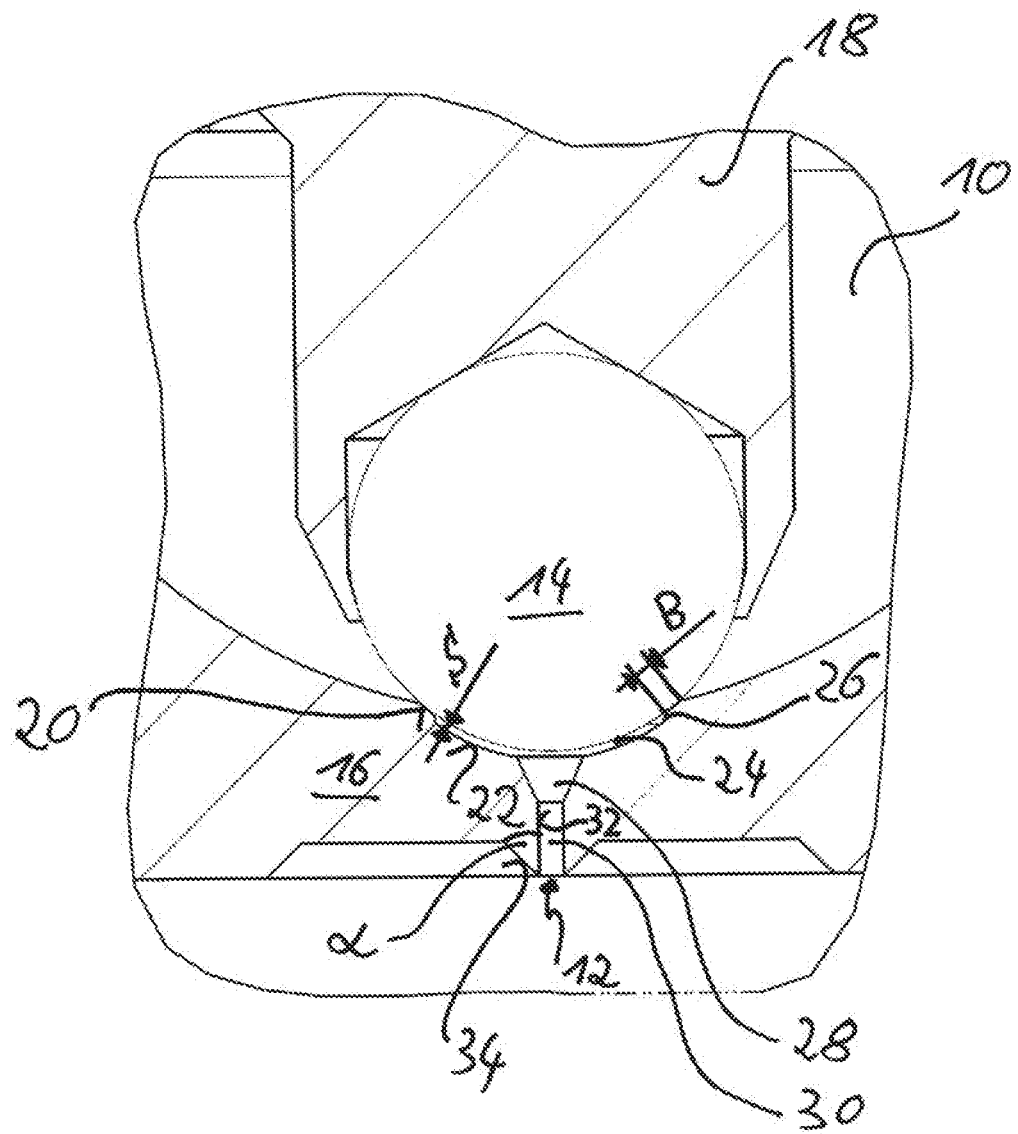
FIG. 1 shows a cross-section through an embodiment of the jet valve.

The jet valve shown only sectionally in FIG. 1 has a medium passage 10 that leads to a discharge opening 12 and that is closable by a sealing element 14 that can be set against a seal seat 16. The sealing element 14 in the embodiment shown has the shape of a sphere that is fastened to the end of a valve needle 18. The valve needle here is set at the seal seat against the force of a spring in a known manner by a valve drive, for example a piezo element, having a high number of cycles.

A sealing surface 20 shaped at the valve seat 16 serves for the sealing between the sealing element 14 and the valve seat 16. Said sealing surface 20 is formed as a sealing chamfer and has the shape of an annular strip (as part of a spherical surface in the embodiment shown) that has a width B.

The seal seat 16 furthermore has a surface contour 22 subsequent to the sealing surface 20 and in the direction of the outlet opening 12 that is spaced apart from the sealing element 14 and forms a gap 24 therewith when the sealing element 14 contacts the sealing surface 20. The width S of the gap 24 can be selected here such that it is no greater than the width B of the annular strip of the sealing surface 20.

As FIG. 1 further shows, a step 26 that has an annular shape is located between the sealing surface 20 and the surface contour 22. Since the surface contour 22 and the sealing element 14 are both spherical and have the same radius, the surface contour extends in parallel with the sealing element 14 in the region of the gap 24 and the step 26 determines the film-like (spherically curved) volume between the surface contour and the sealing element.

In the embodiment shown in FIG. 1, the width B of the annular strip of the sealing surface 20 (the sealing chamfer) is in the range of approximately 40 µm and the angle between a tangent at the sealing surface 20 and a center axis of the jet valve amounts to approximately 45°, which results in a good centration. At the same time, the width S of the gap 24 is selected in an order of magnitude of approximately 10 to 20 µm, which is sufficient to minimize a hydrodynamic damping and simultaneously to jet very small volumes.

The expulsion of the medium supply through the medium passage 10 takes place on the closing of the sealing element 14 through an aperture that leads to the discharge opening 12 and that initially conically tapers in a first section 28, starting from the gap 24, and that is subsequently formed as a hollow cylindrical discharge passage 30 up to the discharge opening 12. In this respect, the hollow cylindrical discharge passage 30 has a diameter of approximately 40 to 50 µm and/or a length of approximately 100 to 300 µm.

The discharge opening 12 is furthermore configured as an orifice of the hollow cylindrical discharge passage 30 and the angle α between the wall 32 of the discharge passage 30 and the surface 34 surrounding the discharge opening 12 is an acute angle, viewed in cross-section, that amounts to approximately 45° in the embodiment shown.

Finally, FIG. 1 illustrates that the discharge opening 12 is not formed in a core that is screwed or otherwise inserted into the valve body. The discharge opening 12 and also the discharge passage 30 are rather in the solid material, that is in a component of the jet valve that is formed in one piece with the seal seat 16 and the sealing surface 20.

Figure 2:
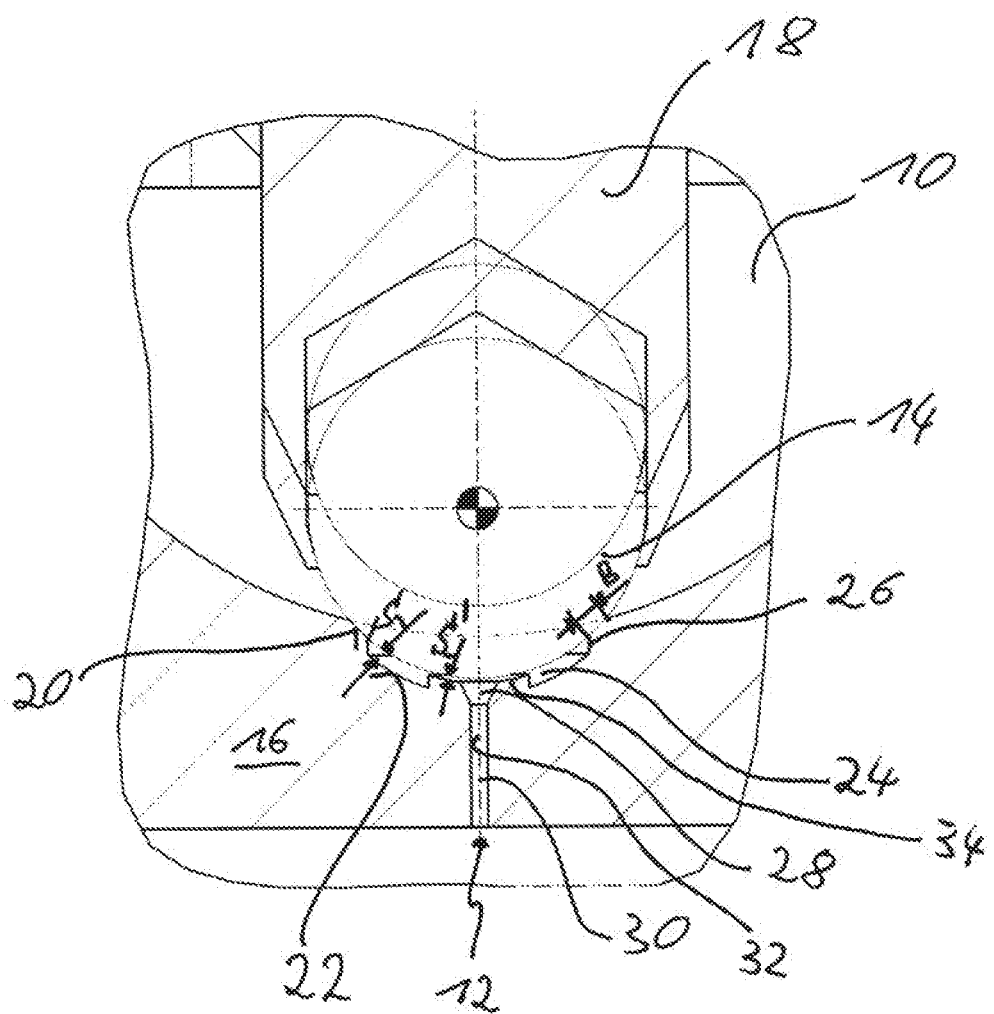
FIG. 2 shows a cross-section through a further embodiment of the jet valve.

A further seal seat geometry that enables a reduction of the metering quantity is shown in FIG. 2. This embodiment of a jet valve shown in FIG. 2 corresponds in its basic design to the embodiment of FIG. 1 so that only the differences will be looked at. In the embodiment shown in FIG. 2, the width S of the gap 24 between the spherical surface contour 22 and the sealing element 14 is considerably larger than in the embodiment shown in FIG. 1. However, the gap 24 is reduced stepwise by an annular web 34 in the region around the nozzle passage 28, 30, for example to a gap width S' of approximately 10 µm. Such a thin gap in the region of the discharge passage increases the flow resistance of the discharge nozzle effectively acting on the expulsion. The stroke that the sealing element 14 finally still makes on the closing of the vale once the flow resistance of the nozzle passage is smaller than the flow resistance of the sealing surface 20 is thus smaller and the metering quantity can thus also be reduced.

FIG. 2 illustrates that in the embodiment shown the conically tapering region 28 of the discharge passage is arranged at the center of the annular web.

The invention claimed is:

1. A jet valve having
    a discharge opening,
    a medium passage that leads to the discharge opening,
    a spherical sealing element, wherein the discharge opening is closable by the spherical sealing element, and
    a seal seat having a sealing surface in the form of a spherically curved annular strip and a spherical surface contour subsequent to the sealing surface in direction of the discharge opening, wherein the spherical sealing element is able to be set against the seal seat such that it abuts the sealing surface to close the discharge opening, and when the spherical sealing element abuts the sealing surface the spherical sealing element is spaced apart from the spherical surface contour such that a gap is formed between the spherical sealing element and the spherical surface contour; and,
    an aperture centrally located on the spherical surface contour and leading to the discharge opening, wherein the spherical surface contour includes a raised portion in a center thereof around the aperture so a width of the gap between the sealing surface and the spherical surface contour around the aperture is a reduced width.

2. The jet valve in accordance with claim 1, wherein the reduced width of the gap between the sealing surface and the spherical surface contour around the aperture leading to the discharge opening is approximately 10-15 μm.

3. The jet valve in accordance with claim 1, wherein the raised portion of the spherical surface contour is provided by an annular web that is arranged around the aperture.

4. A jet valve comprising
    a discharge opening;
    a medium passage that leads to the discharge opening;
    a spherical sealing element, wherein the discharge opening is closable by the spherical sealing element; and
    a seal seat having a sealing surface and a spherical surface contour located in a center of the seal seat, wherein when the spherical sealing element is set against the seal seat it abuts the sealing surface in the form of a spherically curved annular strip to close the discharge opening, wherein the spherical surface contour is stepped down from the sealing surface in a direction toward the discharge opening, wherein the spherical surface contour includes a raised portion in a center thereof in a direction away from the discharge opening, wherein when the spherical sealing element abuts the sealing surface the spherical sealing element is spaced apart from the spherical surface contour by a first gap and the raised portion of the spherical surface contour by a second gap, wherein a width of the second gap is smaller than a width of the first gap.

5. The jet valve of claim 4, further comprising an aperture centrally located on the spherical surface contour in alignment with the raised portion and leading to the discharge opening.

\* \* \* \* \*